US008657341B2

(12) United States Patent
Kraft et al.

(10) Patent No.: US 8,657,341 B2
(45) Date of Patent: Feb. 25, 2014

(54) CONNECTING ELEMENT

(75) Inventors: Torsten Kraft, Solothum (CH); James Richard McLaren, Huntingdon (GB); Allen John Pearson, Huntingdon (GB)

(73) Assignee: Roche Diagnositics International Ltd., Rotkreuz (CH)

( * ) Notice: Subject to any disclaimer, the term of this patent is extended or adjusted under 35 U.S.C. 154(b) by 342 days.

(21) Appl. No.: 12/958,501

(22) Filed: Dec. 2, 2010

(65) Prior Publication Data

US 2011/0291406 A1 Dec. 1, 2011

(30) Foreign Application Priority Data

Dec. 9, 2009 (EP) .................................... 09405219

(51) Int. Cl.
*F16L 35/00* (2006.01)

(52) U.S. Cl.
USPC ............ 285/24; 285/27; 285/111; 285/123.3; 285/123.5

(58) Field of Classification Search
USPC ..................... 285/243, 322, 24, 27, 111–112, 285/123.3–123.9, 123.11
See application file for complete search history.

(56) References Cited

U.S. PATENT DOCUMENTS

| | | | | |
|---|---|---|---|---|
| 2,866,648 | A | 10/1955 | Parsons | |
| 5,509,696 | A | 4/1996 | Smith et al. | |
| 5,647,845 | A | 7/1997 | Haber et al. | |
| 6,676,688 | B2 * | 1/2004 | Dobak, III et al. | 607/105 |
| 2003/0153895 | A1 | 8/2003 | Leinsing | |
| 2005/0167985 | A1 | 8/2005 | Broersma | |
| 2008/0073903 | A1 * | 3/2008 | Bogh-Sorensen | 285/24 |

OTHER PUBLICATIONS

International Search Report, Appl. No. EP 09 40 5219, May 4, 2010, 6 pages.

* cited by examiner

*Primary Examiner* — Aaron Dunwoody
*Assistant Examiner* — Fannie Kee
(74) *Attorney, Agent, or Firm* — Dinsmore & Shohl, LLP

(57) ABSTRACT

A connecting element for establishing a frictional connection with a neck portion of a liquid container, like a vial. The connecting element may include a basic structure and contact elements connected with the basic structure that provide contact surfaces for contacting the neck portion. The contact surfaces may be configured to form a receiving space for receiving the neck portion. The receiving space can be enlarged by moving apart the contact surfaces.

23 Claims, 7 Drawing Sheets

CONNECTING ELEMENT

TECHNICAL FIELD

Figure 1A:
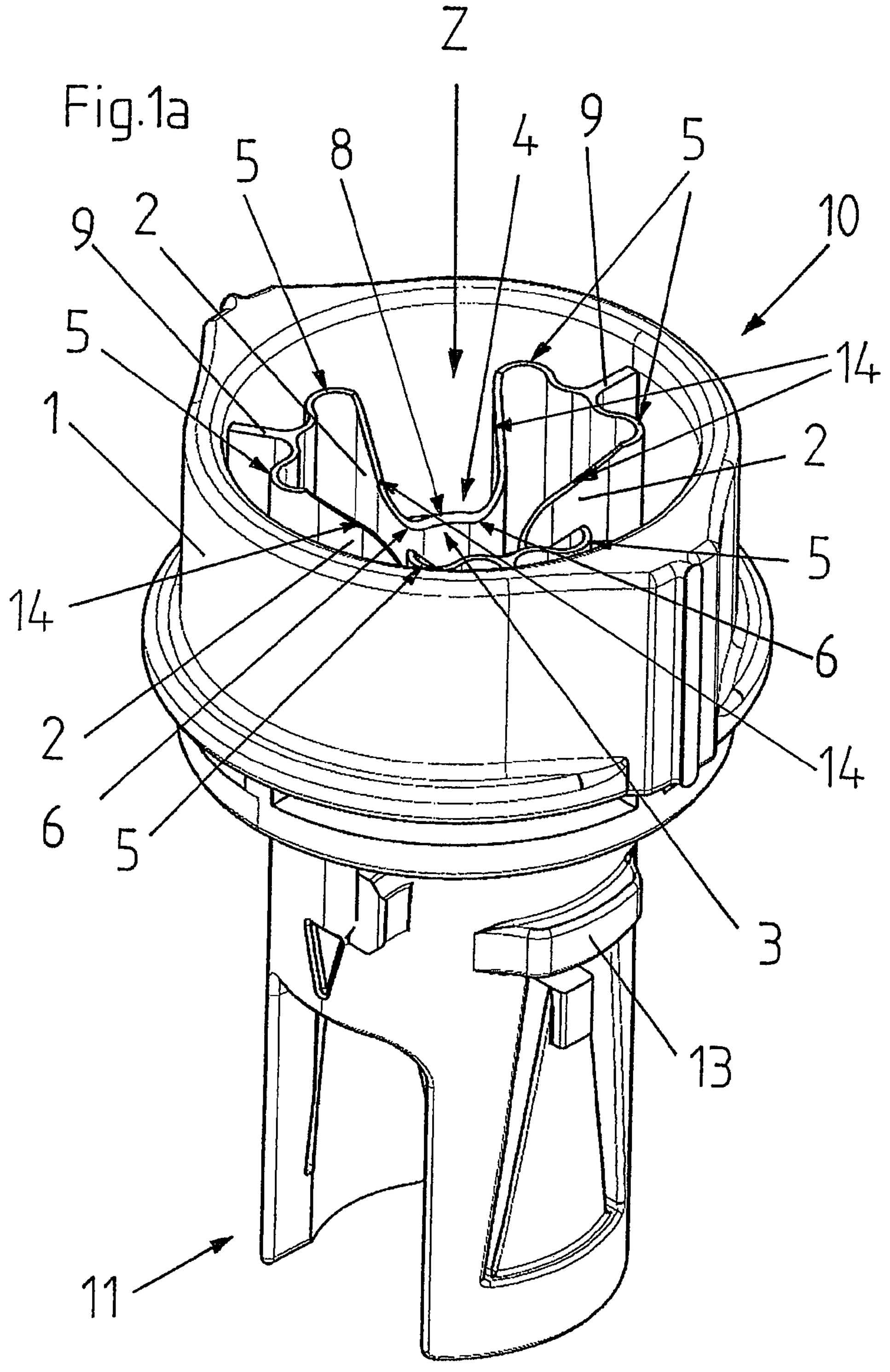

Embodiments of the present disclosure relate to a connecting element for establishing a frictional connection with a cylindrical body. Similarly, some embodiments are directed to an adapter for extracting a liquid drug with such a connecting element and to a use of the adapter according to the preambles of the independent claims.

BACKGROUND

In several technical fields where components are coupled together that do not have a standardized interface, there exists a desire for connection elements that are tolerant regarding the dimensional design of the components. One of these fields is the extraction of liquid drugs from drug reservoirs (e.g. vials or cartridges, in the medical field), where depending on the supplier or the size of the drug reservoir, different geometric shapes of the physical interfaces may have to be covered, often resulting in a desire to provide a separate adapter for each variety.

In particular, in the therapy of diabetes with the use of an insulin pump, the insulin ampoules used in the insulin pump often are not purchased as readily filled products but as empty ampoules which are then, with the aid of a filling device, filled prior to use with insulin from a vial or a pen-cartridge containing the specific type of insulin preferred by the patient. However, while the 10 ml vials typically have a cap diameter of about 14 mm, the 3 ml pen-cartridges may have a cap diameter of about 7 mm, which is a range that could not be handled by many current connecting element designs, thus resulting in the requirement of different filling device adapters for the individual reservoir types.

SUMMARY

The present application concerns a connecting element for establishing a frictional connection with a neck portion of liquid drug container, such as a vial. The connecting element may include a basic structure and contact elements connected with the basic structure that provide contact surfaces for contacting the neck portion. The contact surfaces may be configured to form a receiving space for receiving the neck portion. The receiving space can be enlarged by moving apart the contact surfaces.

Also included are embodiments of an adapter for extracting a liquid drug from a drug reservoir. Embodiments of the adapter include a connecting element that includes a basic structure and a plurality of contact elements. The plurality of contact elements may be connected with the basic structure and may provide at least one contact surface. Each of the at least one contact surfaces may be configured for contacting the cylindrical body at an outer circumference of the cylindrical body to establish the frictional connection between the cylindrical body and the plurality of connecting elements. Additionally, in some embodiments, a receiving space is formed between at least a portion of the plurality of contact elements for receiving the cylindrical body. The receiving space may be configured for enlargement by moving apart the at least one contact surface, to receive cylindrical bodies of different diameters in the receiving space. Similarly, in some embodiments, at least one of the plurality of contact elements is configured as a resilient structure, which at two ends thereof, is connected to the basic structure. Between the two ends, the at least one of the plurality of contact elements provides the at least one contact surface, so that the at least one contact surface, under an elastic deformation of the resilient structure of this contact element between the two ends, can be moved apart from contact surfaces of other contact elements against reset forces generated by deformation of the resilient structure of this contact element.

BRIEF DESCRIPTION

Figure 1B:
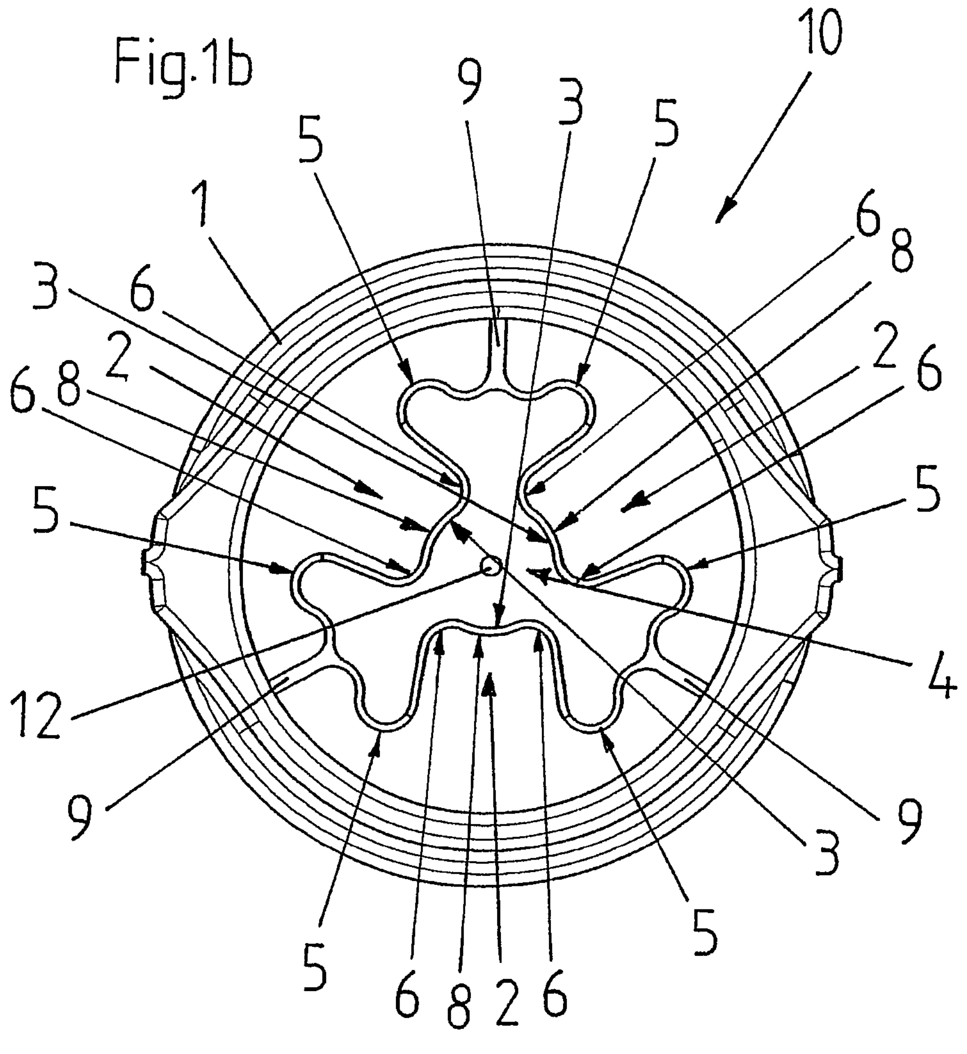
Figure 1C:
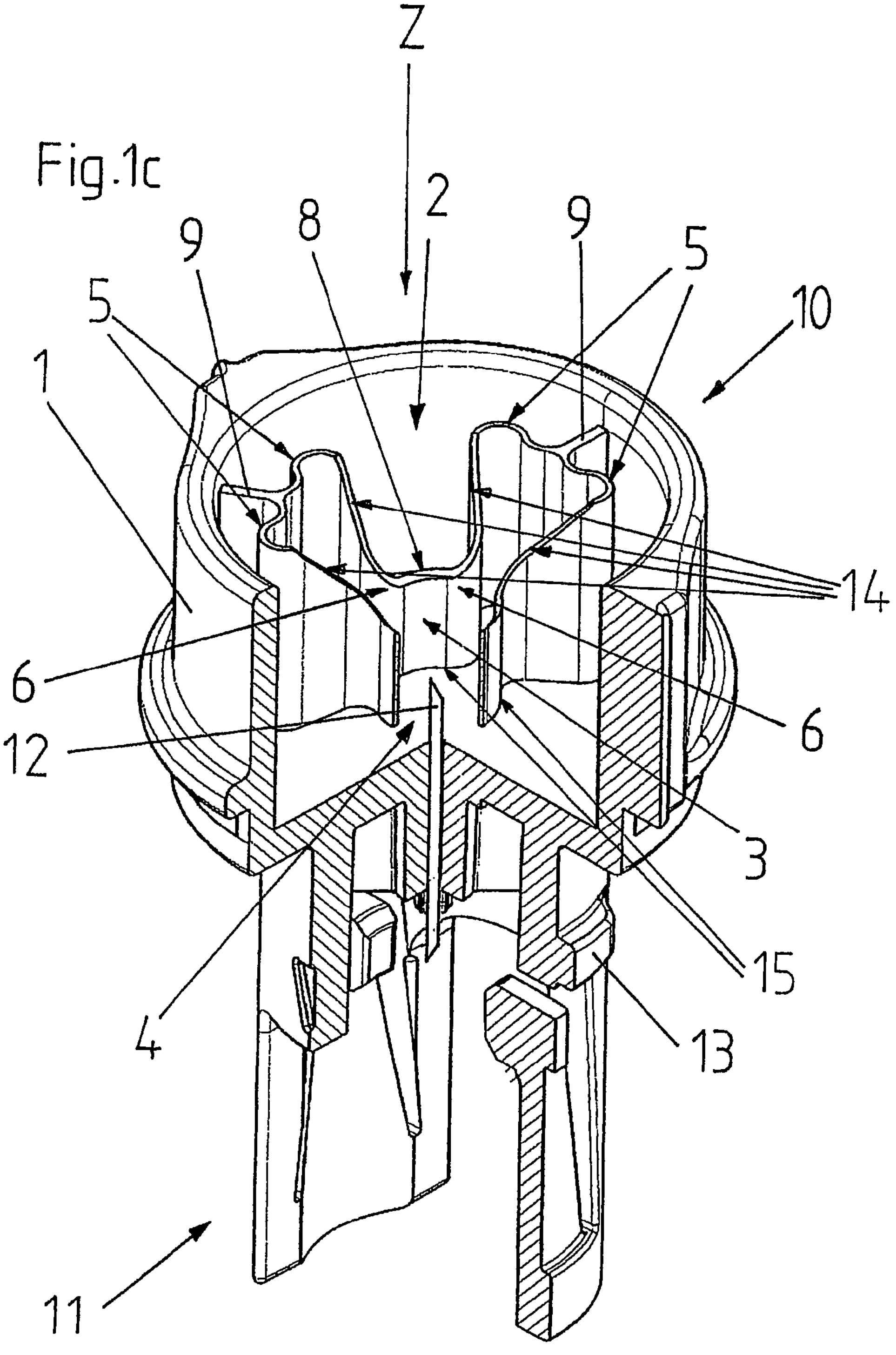
Figure 2A:
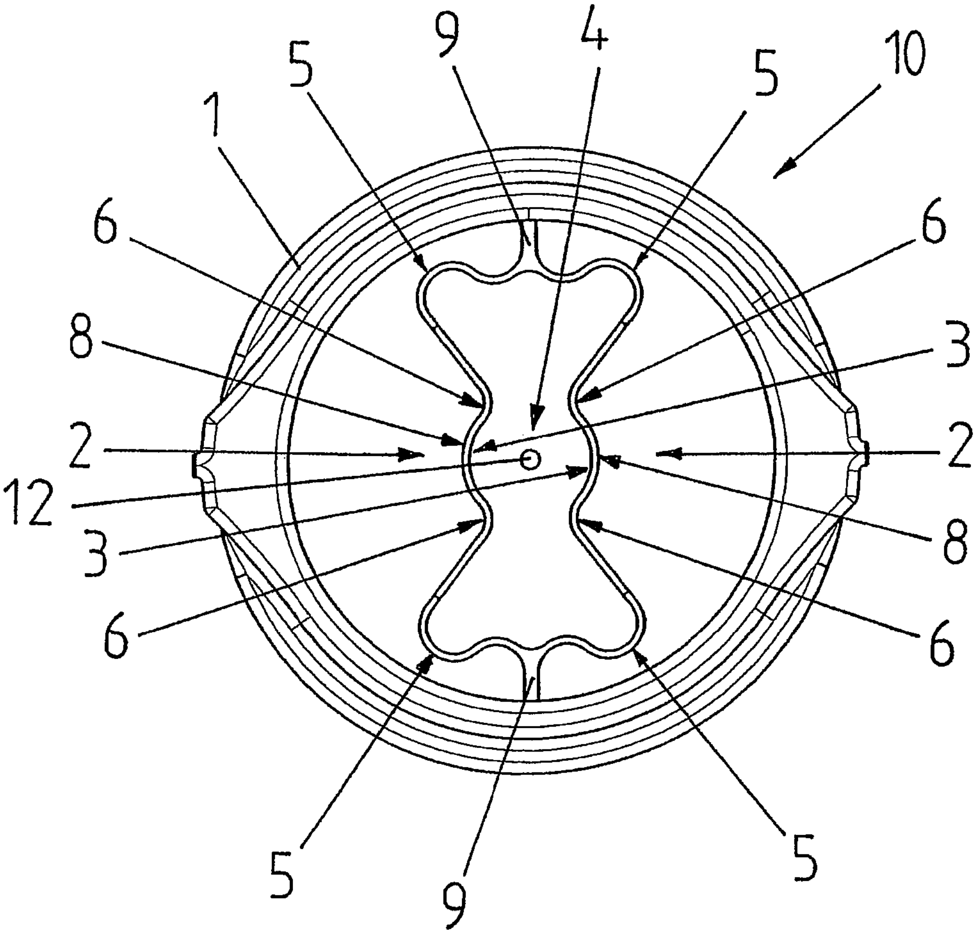
Figure 2B:
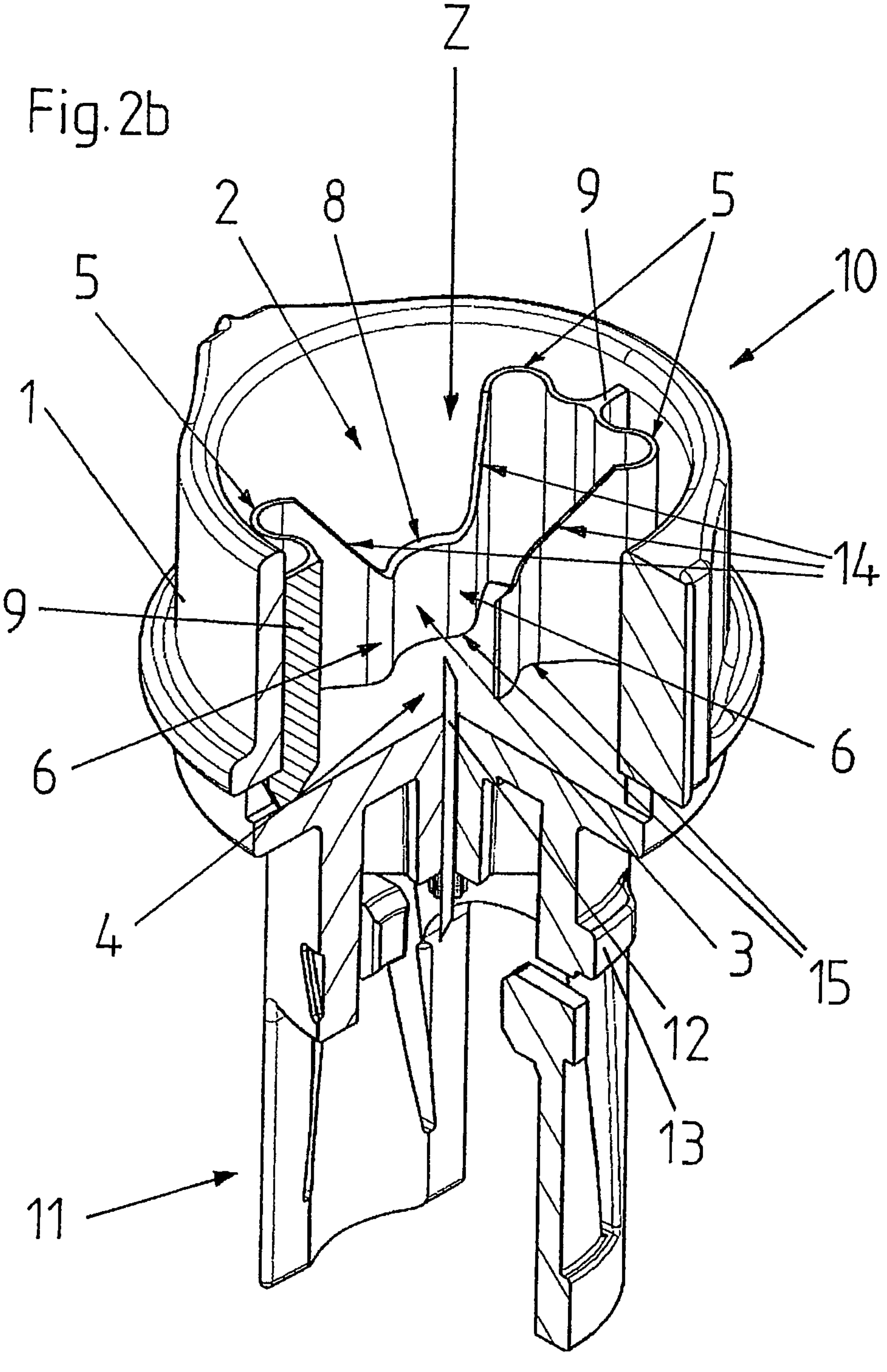
Figure 3A:
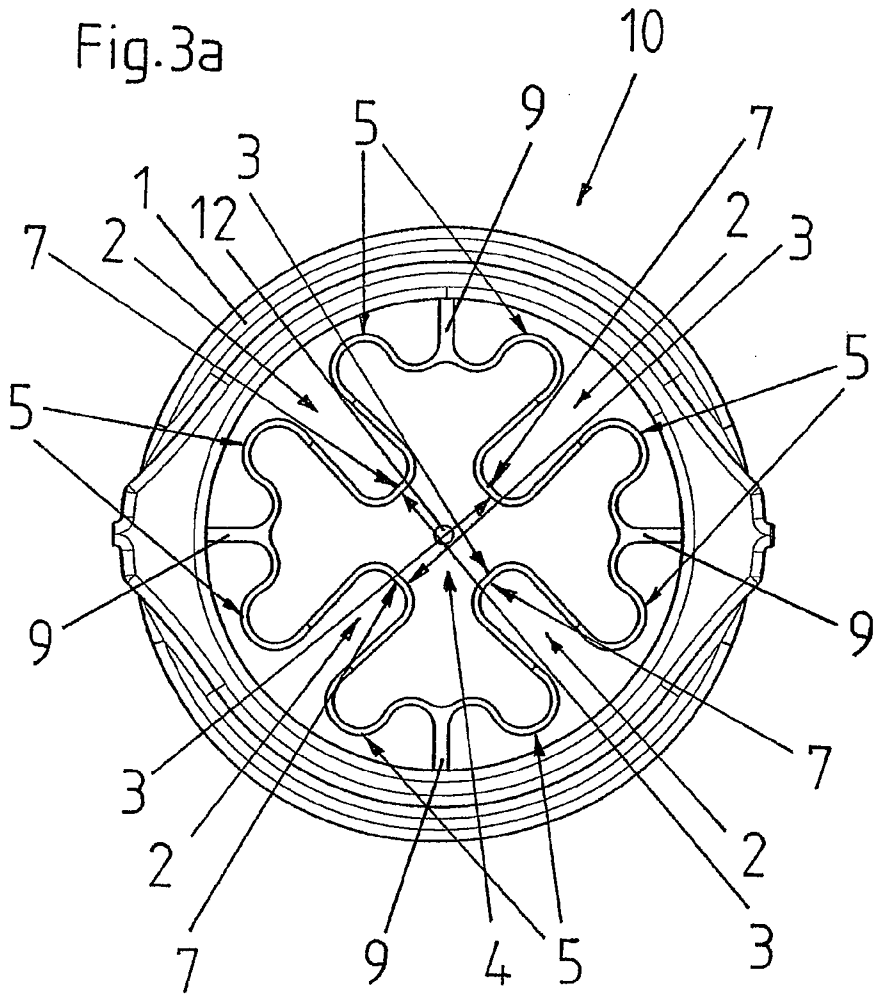
Figure 3B:
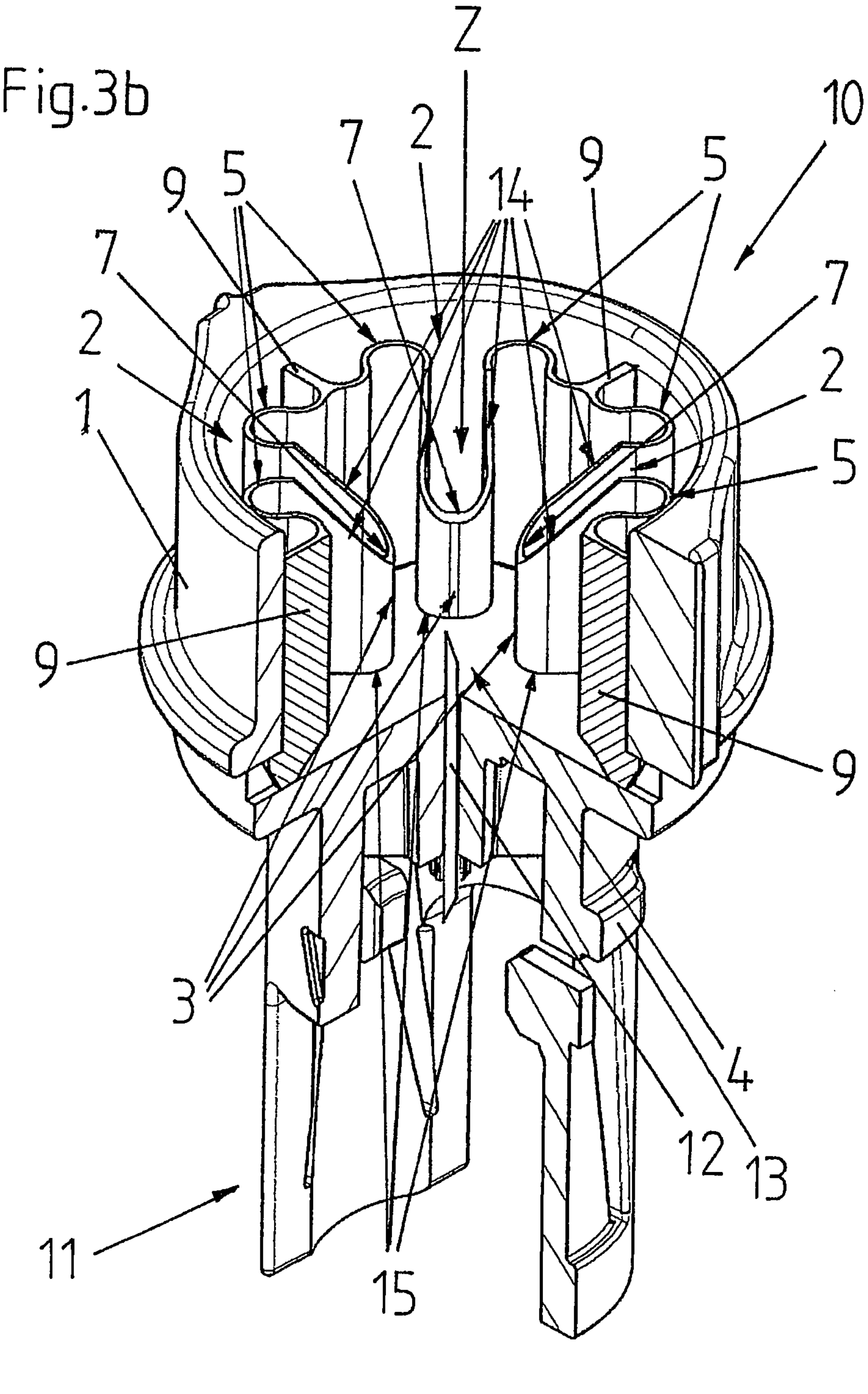

Further embodiments of the present application become apparent from the following description by way of the following drawings:

FIG. 1*a* depicts a perspective view of an adapter, according to embodiments of the present application;

FIG. 1*b* depicts a top view of the adapter of FIG. 1*a*, according to embodiments of the present application;

FIG. 1*c* depicts a perspective view of the adapter of FIG. 1*a* with a portion cut away, according to embodiments of the present application;

FIG. 2*a* depicts a top view of another adapter, according to embodiments the present application;

FIG. 2*b* depicts a perspective view of the adapter of FIG. 2*a* with a portion cut away, according to embodiments of the present application;

FIG. 3*a* depicts a top view of yet another adapter, according to embodiments the present application; and FIG. 3*b* depicts a perspective view of the adapter of FIG. 3*a* with a portion cut away, according to embodiments of the present application.

DETAILED DESCRIPTION

Hence, embodiments of the present application may be configured to provide a connecting element and an adapter therewith that can establish a frictional connection with cylindrical bodies of varying diameters. In particular, some embodiments of the present application provide a connecting element and an adapter therewith that can establish a proper connection with vials and other supply cartridges for liquid drugs having a cap diameter in the range from about 5 mm to about 15 mm.

A first aspect of the present application includes a connecting element for establishing a frictional connection with a cylindrical body (e.g. the neck portion of a vial). The connecting element may include a basic structure and at least two contact elements for contacting the cylindrical body at its outer circumference. Such a configuration may be configured to establish the frictional connection between the cylindrical body and the connecting element. Each of the contact elements may be configured to provide at least one contact surface for contacting the cylindrical body at its outer circumference and may be connected with the basic structure. The contact surfaces of the contact elements form between them a receiving space for receiving the cylindrical body. This receiving space can be enlarged by moving apart relative to each other, against reset forces, contact surfaces of different contact elements, in order to be able to receive cylindrical bodies of different diameters in the receiving space.

At least one of the contact elements may be designed as a resilient structure which, at two ends thereof, is connected to the basic structure and between these two ends provides its contact surface or contact surfaces, so that this or these contact surfaces, under an elastic deformation of the resilient structure of this contact element between its two ends, can be moved apart from the contact surfaces of the other contact elements against reset forces generated by the deformation of the resilient structure of this contact element.

The contact elements of the connecting element, which may have a resilient structure, make use of a compound/curved beam design. Such a design may have a highly non-linear force-displacement relationship, resulting in relatively constant reset forces and thus relatively constant contact forces between the cylindrical body and the contact surfaces regardless of the diameter of the cylindrical body. Because of this configuration, it becomes possible to provide a connecting element that can establish a proper frictional connection with cylindrical bodies of varying diameters. For example, embodiments of this design can provide substantially constant reset forces for particular ranges of displacement and/or substantially similar reset forces for two or more different diameters of the cylindrical body.

In some embodiments of the connecting element, the at least one contact element, which may be designed as a resilient structure with at least one of its two ends loosely connected with the basic structure. In some embodiments, the respective end is merely supported by the basic structure against moving in a direction away from the receiving space. Such embodiments may result in a multi-component design where the connecting element is formed by at least two separate components. The at least one contact element in this case could, in some embodiments, be realized as an insertable spring component.

In some embodiments, the at least one contact element may include two ends that are firmly connected with the basic structure, while utilizing a one-piece design. In such embodiments, there are generally no loose parts that can get lost. In a further embodiment, the at least one contact element, which is designed as a resilient structure, and in which each of the regions where the at least one contact element is connected to the basic structure, forms a resilient curve or loop pointing away from the receiving space. In still a further embodiment, the at least one contact element, in the region where the at least one contact element provides at least one contact surface, forms at least one resilient curve or loop pointing towards the receiving space. In yet a further embodiment, the at least one contact element, in the region where the at least one contact element provides at least one contact surface, forms exactly two resilient curves or loops pointing towards the receiving space, which preferably are connected via a curved section pointing away from the receiving space.

In the above mentioned embodiments having contact elements with resilient curves or loops, these contact elements may have a band-like shape, at least in the areas of the resilient curves or loops, and in some embodiments, over the entire extent. In yet some embodiments, the at least one contact element, which may be designed as a resilient structure, may extend between the two ends that are connected with the basic structure in a plane that is transverse to the direction in which the cylindrical body can be inserted and received in the receiving space.

In case of a connecting element having several contact elements that are designed as a resilient structure, these contact elements, between the two ends that are connected with the basic structure, in each case extend in a common plane that is transverse to the direction in which the cylindrical body can be inserted and received in the receiving space. Such a design makes it possible to provide relative compact and shallow connecting elements according to the present application.

To facilitate the introduction of a cylindrical body into the receiving space, in some embodiments, the contact elements, seen in the direction in which the cylindrical body can be inserted and received, respectively, in the receiving space, are located in the region where the contact elements border the receiving space and have a chamfered shape. In such configurations, this shape guides the cylindrical body into the receiving space when it is introduced in the connecting element.

Additionally, to enable positive locking of a stepped cylindrical body in a direction opposite to the direction in which the cylindrical body can be introduced into the receiving space, in some embodiments, the contact elements, seen in the direction opposite to the direction in which the cylindrical body can be received in the receiving space, in the region where they border the receiving space have a square-edged shape. In still some embodiments, contact elements of the connecting element may be designed as a resilient structure. Thus, in such embodiments, it becomes possible to design the connecting element in such a manner that it centers cylindrical bodies of different diameters received in its receiving space relative to its basic structure, which is desirable. In such embodiments, the connecting element may include exactly two, exactly three or exactly four contact elements; however these are merely exemplary embodiments.

Further, in some embodiments, two ends of adjacent contact elements are connected with the substantially rigid basic structure via a common web. By this, the self centering characteristics of the connecting element can further be improved. In still a further embodiment of the connecting element, the substantially rigid basic structure substantially has the shape of a circular ring. In some embodiments, the circular ring may protrude over the contact elements in a direction opposite to the direction that the cylindrical body can be received in the receiving space. This design makes it possible to mechanically connect the neck portions of cylindrical containers (e.g. bottles or vials), with the connecting element by receiving the connecting element in the receiving space and at the same time support the body of the bottle or vial against tilting with the structure that protrudes over the contact elements.

In yet a further embodiment, the connecting element may be configured in such a manner that the connecting element establishes a frictional connection with cylindrical bodies that have a diameter may range from about 5 mm to about 15 mm. This makes it possible to connect the connecting element to standard vials containing liquid drugs, (e.g. insulin), having a neck portion diameter of about 14 mm as well as to pen-cartridges containing liquid drugs, which may have a neck portion diameter of about 7 mm. This makes the connection element suitable for use in applications where liquid drugs are extracted from such containers (e.g. in an adapter), according to a second aspect of the present application.

In still further embodiments of the connecting element, the contact elements may be designed in such a manner that the reset forces, and thus the contact forces between the cylindrical body received in the receiving space and the contact surfaces of the contact elements, are the same for cylindrical bodies of at least two different diameters. From this, substantially similar frictional connecting forces can be ensured for both diameters.

A second aspect of the present application concerns an adapter for a system for extracting a liquid drug (such as insulin) from a drug reservoir, where the adapter includes a connecting element according to the first aspect of the present application for connecting the adapter to the drug reservoir, (e.g. a standard vial or a pen-cartridge). In some embodiments, the adapter additionally includes connecting means for connecting the adapter to an ampoule and a cannula extending between the connecting element for the drug reservoir and the connecting means for the ampoule in order to allow a transfer of liquid drug between a drug reservoir coupled to the connecting element and an ampoule coupled to the means for connecting the adapter to an ampoule.

Similarly, in some embodiments, the cannula runs in a longitudinal direction of the adapter, where the connecting element for the drug reservoir is arranged at one end of the adapter and the connecting means for the ampoule is arranged at the other end of the adapter. In still some embodiments, the adapter further includes a mechanical connecting means for mechanically connecting the adapter to a structure of a system for extracting a liquid drug from a drug reservoir. The mechanical connecting means may include a mating half of a threaded connection and/or of a bayonet joint, which may be arranged at the outer circumference of the adapter. From this configuration, it becomes possible not only to connect a liquid drug reservoir and, where applicable, an ampoule for receiving liquid drug with the adapter, but also to connect the adapter, the liquid drug reservoir and, if so, the ampoule, with other structures. The other structures may include apparatuses and devices, such as those for effecting a transfer of liquid drug from the liquid drug reservoir container via the adapter to a receiving line (e.g. a catheter, an ampoule coupled to the adapter, etc.).

In yet a further embodiment, the adapter may include an empty ampoule connected to the connecting means for the ampoule, wherein the connecting means may be configured in such a manner that the adapter can be separated from the ampoule after a filling of the ampoule with a liquid drug via the adapter. Such adapters with ampoules constitute commercial products that can be used for examples such as self filling cartridges for insulin pumps. A third aspect of the present application concerns the use of the adapter for extracting a liquid drug, preferably insulin, from a drug reservoir.

Referring now to the drawings, FIGS. 1*a*-1*c* depict an adapter for a system for extracting insulin from a standard vial or from a pen-cartridge according to the second aspect of the present application, once in a perspective view (FIG. 1*a*), once in a top view (FIG. 1*b*) and once in a perspective view like in FIG. 1*a* but with a portion cut away (FIG. 1*c*).

As can be seen, the adapter includes, at its top, a connecting element 10 according to the first aspect of the present application for connecting the vial or pen-cartridge. At its bottom, the adapter includes connecting means, such as an ampoule connector 11 for connecting an ampoule to the adapter. Between the connecting element 10 and the ampoule connector 11 for connecting an ampoule, in axial direction of the adapter there extends a cannula 12 (FIG. 1*b*) for establishing a fluidic connection between the vial or pen-cartridge to be connected to the connecting element 10 and the ampoule to be connected to the ampoule connector 11. At its outer circumference, the adapter includes a mating half of a bayonet joint 13, for mechanically connecting the adapter to a structure of a system by which the piston of the ampoule to be connected can be moved within the body of the ampoule in order to affect a filling of the ampoule.

The connecting element 10 of the adapter includes a basic structure 1, such as a substantially rigid basic structure that substantially has the shape of a circular ring. Inside the basic structure 1, three contact elements 2 are arranged, which provide contact surfaces 3 for contacting the neck portion of the vial or pen-cartridge at an outer circumference of the neck portion in order to establish the frictional connection between the neck portion and the contact elements 2. The contact surfaces 3 have a receiving space 4 between the contact surfaces 3 for receiving the neck portion. The contact elements 2 may he configured in a band-like shape over their entire extent. At the two ends, the contact elements 2, via a resilient loop 5 of their band-like shape pointing away from the receiving space 4 and via a web 9, firmly by one-piece design are connected to the basic structure 1. Between their two ends, the contact elements 2 in each case provide their contact surface 3, which in each case is formed by two resilient curves 6 of their band-like shape that are pointing towards the receiving space 4 and that are connected via a curved section 8 pointing away from the receiving space 4.

Through this design, each of the contact elements 2 forms a resilient structure that renders it possible that the corresponding contact surface 3, under an elastic deformation of this contact element 2 between its two ends, can be moved apart from the contact surfaces 3 of the other contact elements 2 against reset forces generated by the deformation of this contact element 2.

Due to this movability of the contact surfaces 3 of the contact elements 2, the receiving space 4 formed between them can be enlarged by moving apart, against the respective reset forces, the contact surfaces 3 of the contact elements 2. This allows for receipt of the neck portion of a standard vial having a diameter of about 14 mm as well as the neck portion of a pen-cartridge having a diameter of about 7 mm within the receiving space 4.

Due to the design of the contact elements 2 that makes use of a compound/curved beam design which has a highly non-linear force-displacement relationship, the reset forces and thus the contact forces between the neck portion and the contact surfaces 3, which generate the frictional connection, are substantially similar for both neck portion diameters, resulting in substantially similar frictional connecting forces for both neck portion diameters.

Due to the fact that the contact elements 2 are substantially similar, in each case they center the neck portions of the vial and the pen-cartridge to be received in the receiving space 4 relative to the basic structure 1. As can best be seen in FIG. 1*c*, the contact elements 2, between their ends which are connected with the basic structure, in each case extend in a common plane, which is transverse to the direction Z in which the neck portion can be introduced and be received in the receiving space 4. The basic structure 1 in a direction opposite to this direction Z protrudes over the contact elements 2, so that it can stabilize the body portion of a vial to be connected to the adapter.

Seen in the direction Z in which the neck portion can be introduced and be received in the receiving space 4, the contact elements 2, in the region where they border the receiving space 4, at their top face form ramps 14 so that they have a chamfered shape in order to facilitate the introduction of a cylindrical body into the receiving space 4.

At the bottom side, in the region where the contact elements 2 border the receiving space 4, the contact elements 2 have a square-edged shape 15 in order to enable a positive locking in a direction opposite to the direction Z in which the neck portion of the vial or pen-cartridge can be introduced into the receiving space 4 of a rim formed at said neck portion.

FIGS. 2*a*, 2*b* and 3*a*, 3*b* are similar to FIGS. 1*b* and 1*c* of the adapter according to the second aspect of the present application, which feature exactly two or exactly four, respectively, identical contact elements 2. Due to the confined space conditions in the embodiment shown in the FIGS. 3*a* and 3*b*, in the third embodiment the contact elements 2 in the region where the contact elements 2 provide the contact surface 3 in each case form a resilient loop 7 pointing towards the receiving space 4.

While there are shown and described presently preferred embodiments of the present application, it is to be distinctly understood that the present application is not limited thereto but may be otherwise variously embodied and practiced within the scope of the following claims.

The invention claimed is:

1. A connecting element for establishing a frictional connection with a cylindrical body, comprising:

a substantially rigid basic structure; and a plurality of contact elements connected with the substantially rigid basic structure, the plurality of contact elements providing at least one contact surface, each of the at least one contact surface for contacting the cylindrical body at an outer circumference of the cylindrical body to establish the frictional connection between the cylindrical body and the plurality of contact elements, wherein, between at least a portion of the plurality of contact elements, a receiving space is formed for receiving the cylindrical body, the receiving space being configured for enlargement by moving apart the at least one contact surface, to receive cylindrical bodies of different diameters in the receiving space;

wherein the plurality of contact elements is configured as a resilient structure which, at two ends thereof, is connected to the substantially rigid basic structure and between the two ends provides the at least one contact surface, so that the at least one contact surface, under an elastic deformation of the resilient structure of the plurality of contact elements between the two ends, can be moved apart from contact surfaces of other contact elements against reset forces generated by deformation of the resilient structure of the plurality of contact elements;

wherein the plurality of contact elements is connected with the substantially rigid basic structure via a one-piece design; and wherein a portion of the one-piece design is in direct contact with an inner surface of the substantially rigid basic structure and the one-piece design has a continuous perimeter forming a closed shape.

2. The connecting element according to claim 1, wherein at least one of the plurality of contact elements is loosely connected with the substantially rigid basic structure, in that the at least one of the two ends is supported by the substantially rigid basic structure against moving in a direction away from the receiving space.

3. The connecting element according to claim 1, wherein at least one of the plurality of contact elements is firmly connected with the substantially rigid basic structure via the one-piece design.

4. The connecting element according to claim 1, wherein at least one of the plurality of contact elements forms a resilient curve pointing away from the receiving space in a region, where the at least one of the plurality of contact elements is connected with the substantially rigid basic structure.

5. The connecting element according to claim 4, wherein at least in an area of the resilient curve, the at least one of the plurality of contact elements has a band shape.

6. The connecting element according to claim 1, wherein at least one of the plurality of contact elements forms at least one resilient curve towards the receiving space in a region where the at least one of the plurality of contact elements provides the at least one contact surface.

7. The connecting element according to claim 6, wherein the plurality of contact elements form exactly two resilient curves pointing towards the receiving space that are connected via a curved section pointing away from the receiving space, in the region where the plurality of contact elements provides the at least one contact surface.

8. The connecting element according to claim 1, wherein at least one of the plurality of contact elements connected with the substantially rigid basic structure extends between the two ends in a plane that is transverse to a direction in which the cylindrical body can be received in the receiving space.

9. The connecting element according to claim 8, wherein each of the plurality of contact elements extends between the two ends that are connected with the substantially rigid basic structure, in a common plane that is transverse to the direction in which the cylindrical body can be received in the receiving space.

10. The connecting element according to claim 8, wherein, seen in the direction in which the cylindrical body can be received in the receiving space, the plurality of contact elements have a chamfered shape in a region where the contact elements border the receiving space to facilitate introduction of the cylindrical body into the receiving space.

11. The connecting element according to claim 8, wherein, seen in the direction opposite to the direction in which the cylindrical body can be received in the receiving space, the plurality of contact elements have a square-edged shape in a region where the plurality of contact elements border the receiving space, to enable positive locking of a stepped cylindrical body in a direction opposite to the direction in which the cylindrical body can be introduced into the receiving space.

12. The connecting element according to claim 1, wherein the plurality of contact elements are at least one of the following in number: exactly two, exactly three and exactly four.

13. The connecting element according to claim 12, wherein ends of adjacent contact elements are connected with the substantially rigid basic structure via a common web.

14. The connecting element according to claim 1, wherein the substantially rigid basic structure substantially has a shape of a circular ring, which in a direction opposite to the direction in which the cylindrical body can be received in the receiving space, protrudes over the plurality of contact elements.

15. The connecting element according to claim 1, wherein the connecting element is designed to establish the frictional connection with cylindrical bodies of a diameter from about 5 mm to about 15 mm.

16. The connecting element according to claim 1, wherein the connecting element is designed such that the connecting element centers cylindrical bodies of different diameters received in the receiving space relative to the basic structure.

17. The connecting element according to claim 1, wherein the reset forces are substantially the same for cylindrical bodies of a plurality of different diameters.

18. The connecting element of claim 1 further comprising a mating half of a bayonet joint, wherein the connecting element comprises the top portion of an adapter, and at an outer circumference of the adapter, the adapter includes the mating half of the bayonet joint, for mechanically connecting the adapter to a system in order to effect a filling of an ampoule.

19. The connecting element of claim 1 wherein the plurality of contact elements comprises three contact elements.

20. An adapter for extracting a liquid drug from a drug reservoir, comprising:

a connecting element that comprises:

a basic structure; and a plurality of contact elements connected with the basic structure, the plurality of contact elements providing at least one contact surface, each of the at least one contact surface for contacting a cylindrical body at an outer circumference of the cylindrical body to establish a frictional connection between the cylindrical body and the plurality of contact elements, wherein, between at least a portion of the plurality of contact elements, a receiving space is formed for receiving the cylindrical body, the receiving space being configured for enlargement by moving apart the at least one contact surface, to receive cylindrical bodies of different diameters in the receiving space;

wherein the plurality of contact elements is configured as a resilient structure which, at two ends thereof, is connected to the basic structure and between the two ends provides the at least one contact surface, so that the at least one contact surface, under an elastic deformation of the resilient structure of the plurality of contact elements between the two ends, can be moved apart from contact surfaces of other contact elements against reset forces generated by deformation of the resilient structure of the plurality of contact elements;

wherein the plurality of contact elements is connected with the basic structure via a one-piece design and wherein a portion of the one-piece design is in direct contact with an inner surface of the basic structure and the one-piece design has a continuous perimeter forming a closed shape.

21. The adapter according to claim 20, wherein the adapter further comprises:

connecting means for connecting the adapter to an ampoule; and a cannula extending between the connecting element for the drug reservoir and the connecting means for the ampoule to allow a transfer of the liquid drug between the drug reservoir and the ampoule coupled to the adapter.

22. The adapter according to claim 21, wherein the cannula runs in a longitudinal direction of the adapter and the connecting element for the drug reservoir is arranged at one end and the connecting means for the ampoule are arranged at an other end of a longitudinal extent of the adapter.

23. The adapter according to claim 20, further comprising mechanical connecting means for mechanically connecting the adapter to a structure for extracting the liquid drug from the drug reservoir.

* * * * *

UNITED STATES PATENT AND TRADEMARK OFFICE

CERTIFICATE OF CORRECTION

PATENT NO. : 8,657,341 B2
APPLICATION NO. : 12/958501
DATED : February 25, 2014
INVENTOR(S) : Torsten Kraft et al.

It is certified that error appears in the above-identified patent and that said Letters Patent is hereby corrected as shown below:

On the title page

Item (75) Inventors: "Torsten Kraft, Solothum (CH)" should read --Torsten Kraft, Solothurn (CH)--;

Item (73) Assignee: "Roche Diagnositics International Ltd." should read --Roche Diagnostics International AG--;

In the specification

Col. 2, Line 21, "embodiments the" should read --embodiments of the--;

Col. 2, Line 26, "embodiments the" should read --embodiments of the--;

Col. 4, Line 18, "however these" should read --however, these--;

Col. 5, Line 63, "may he" should read --may be--; and

Col. 6, Line 58, "in the FIGS." should read --in FIGS.--.

Signed and Sealed this
Twenty-seventh Day of May, 2014

Michelle K. Lee
*Deputy Director of the United States Patent and Trademark Office*